(12) United States Patent
Pan et al.

(10) Patent No.: US 9,690,180 B2
(45) Date of Patent: Jun. 27, 2017

(54) PRISM GROUP AND PROJECTION APPARATUS

(71) Applicant: National Chiao Tung University, Hsinchu (TW)

(72) Inventors: Jui-Wen Pan, Hsinchu (TW); Yung-Chih Huang, Chiayi County (TW); Ping-Chun Lin, Chiayi (TW); Che-Wen Chiang, New Taipei (TW)

(73) Assignee: National Chiao Tung University, Hsinchi (TW)

( * ) Notice: Subject to any disclaimer, the term of this patent is extended or adjusted under 35 U.S.C. 154(b) by 118 days.

(21) Appl. No.: 14/791,261

(22) Filed: Jul. 3, 2015

(65) Prior Publication Data

US 2017/0003582 A1    Jan. 5, 2017

(51) Int. Cl.
| | |
|---|---|
| G03B 21/28 | (2006.01) |
| H04N 9/31 | (2006.01) |
| G02B 5/04 | (2006.01) |
| G03B 21/00 | (2006.01) |
| G02B 26/08 | (2006.01) |

(52) U.S. Cl.
CPC .............. *G03B 21/28* (2013.01); *G02B 5/04* (2013.01); *G03B 21/008* (2013.01); *G02B 26/0833* (2013.01); *H04N 9/3111* (2013.01)

(58) Field of Classification Search
CPC .. G03B 21/008; G03B 821/28; G02B 27/126; G02B 17/006; G02B 5/04; G02B 26/0833; G02B 17/0856; H04N 9/3111
USPC .............................................. 353/81, 98, 33
See application file for complete search history.

(56) References Cited

U.S. PATENT DOCUMENTS

| | | | |
|---|---|---|---|
| 2003/0123162 A1* | 7/2003 | Penn ................... | G02B 26/0833 359/833 |
| 2003/0151834 A1* | 8/2003 | Penn ....................... | G02B 5/04 359/833 |
| 2004/0057123 A1 | 3/2004 | Magocs et al. | |
| 2005/0162616 A1* | 7/2005 | Gupta .................. | H04N 5/7458 353/33 |

OTHER PUBLICATIONS

Pan et al., "High contrast ratio prism design in a mini projector," Applied Optics, Dec. 1, 2013, pp. 8347-8354.

(Continued)

*Primary Examiner* — Toan Ton
*Assistant Examiner* — Ryan Howard
(74) *Attorney, Agent, or Firm* — Jianq Chyun IP Office

(57) ABSTRACT

A prism group including a first, a second, and a third prisms is provided. The first prism has a first light incidence surface, a first light emitting surface, and a first connecting surface. The second prism has a second light incidence surface, a second light emitting surface, and a second connecting surface. The second light incidence surface is located between the first light emitting surface and the second light emitting surface. A first air gap is between the second light incidence surface and the first light emitting surface. The third prism has a third light incidence surface, a third light emitting surface, and a third connecting surface. The third light incidence surface is located between the second light emitting surface and the third light emitting surface. A second air gap is between the third light incidence surface and the second light emitting surface. A projection apparatus is also provided.

14 Claims, 9 Drawing Sheets

(56) References Cited

OTHER PUBLICATIONS

Pan et al., "Portable digital micromirror device projector using a prism," Applied Optics, Aug. 1, 2007, pp. 5097-5102.
Chang et al., "Design of illumination and projection optics for projectors with single digital micromirror devices," Applied Optics, Jul. 1, 2000, pp. 3202-3208.
Meuret et al., "Contrast-improving methods for Digital Micromirror Device projectors," Opt. Eng., Mar. 2003, pp. 840-845.
Huang et al., "High contrast ratio and compact-sized prism for DLP projection system," Optics Express, Jul. 14, 2014, pp. 17016-17029.
Texas Instruments, "DLP™ System Optics," Application Report, Jul. 2010, pp. 1-26.

\* cited by examiner

PRISM GROUP AND PROJECTION APPARATUS

BACKGROUND

Technical Field

The present disclosure relates to an optical element and an image apparatus, and particularly relates to a prism group and a projection apparatus.

Description of Related Art

Generally, a projection apparatus includes an illumination system, a light valve, and a projection lens. The illumination system is adapted for providing illumination beam to illuminate the light valve. The light valve then converts the illumination beam into an image beam, and the image beam is projected by the projection lens on a screen to generate an image on screen. As the projection apparatus projects a completely black image, the light valve (e.g. a digital micro-mirror device, hereinafter "DMD") is unable to terminate all the lights to send to the projection lens and the screen. A basic brightness remains on the screen even with a completely black image. When the basic brightness is too high, the black image becomes not black enough. Hence, the contrast ratio of the image projected by the projection apparatus decreases.

SUMMARY

The disclosure is directed to a prism group, which is capable of deviate the image beam off the projection lens when the micro-mirrors of the DMD are in OFF or FLAT states.

The disclosure is also directed to a projection apparatus, which has good image quality.

The disclosure provides a prism group which is applied to a projection apparatus comprising a digital micro-mirror device and a projection lens. The prism group comprises a first prism, a second prism, and a third prism. The first prism has a first light incidence surface, a first light emitting surface, and a first connecting surface connecting the first light incidence surface and the first light emitting surface. The second prism is close to the first light emitting surface and has a second light incidence surface, a second light emitting surface, and a second connecting surface connecting the second light incidence surface and the second light emitting surface, wherein the second light incidence surface is parallel to the first light emitting surface and located between the first light emitting surface and the second light emitting surface, and a first air gap is between the second light incidence surface and the first light emitting surface. The third prism is close to the second light emitting surface and has a third light incidence surface, a third light emitting surface, and a third connecting surface connecting the third light incidence surface and the third light emitting surface, wherein the third light incidence surface is parallel to the second light emitting surface and located between the second light emitting surface and the third light emitting surface, and a second air gap is between the third light incidence surface and the second light emitting surface. The digital micro-mirror device faces the second connecting surface, and the projection lens is located next to the third light emitting surface.

The disclosure also provides a projection apparatus comprising an illumination system, a prism group, a digital micro-mirror device, and a projection lens. The illumination system provides an illumination beam. The prism group is disposed on a transmission path of the illumination beam and comprises a first prism, a second prism, and a third prism. The first prism has a first light incidence surface, a first light emitting surface, and a first connecting surface connecting the first light incidence surface and the first light emitting surface. The second prism is close to the first light emitting surface and has a second light incidence surface, a second light emitting surface, and a second connecting surface connecting the second light incidence surface and the second light emitting surface, wherein the second light incidence surface is parallel to the first light emitting surface and located between the first light emitting surface and the second light emitting surface, and a first air gap is between the second light incidence surface and the first light emitting surface. The third prism is close to the second light emitting surface and has a third light incidence surface, a third light emitting surface, and a third connecting surface connecting the third light incidence surface and the third light emitting surface, wherein the third light incidence surface is parallel to the second light emitting surface and located between the second light emitting surface and the third light emitting surface, and a second air gap is between the third light incidence surface and the second light emitting surface. The digital micro-mirror device faces the second connecting surface and converts the illumination beam into an image beam. The projection lens is disposed on a transmission path of the image beam and located next to the third light emitting surface.

Based on the above, since the image beam is deviated by the prism group through total inner reflection as tilt angles of the micro-mirrors of the DMD are 0° or −12° respectively, the prism group is capable of deviate the image beam off the projection lens when the micro-mirrors are in OFF or FLAT states, and the image quality (e.g. contrast ratio) of the projection apparatus using the same can be improved.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
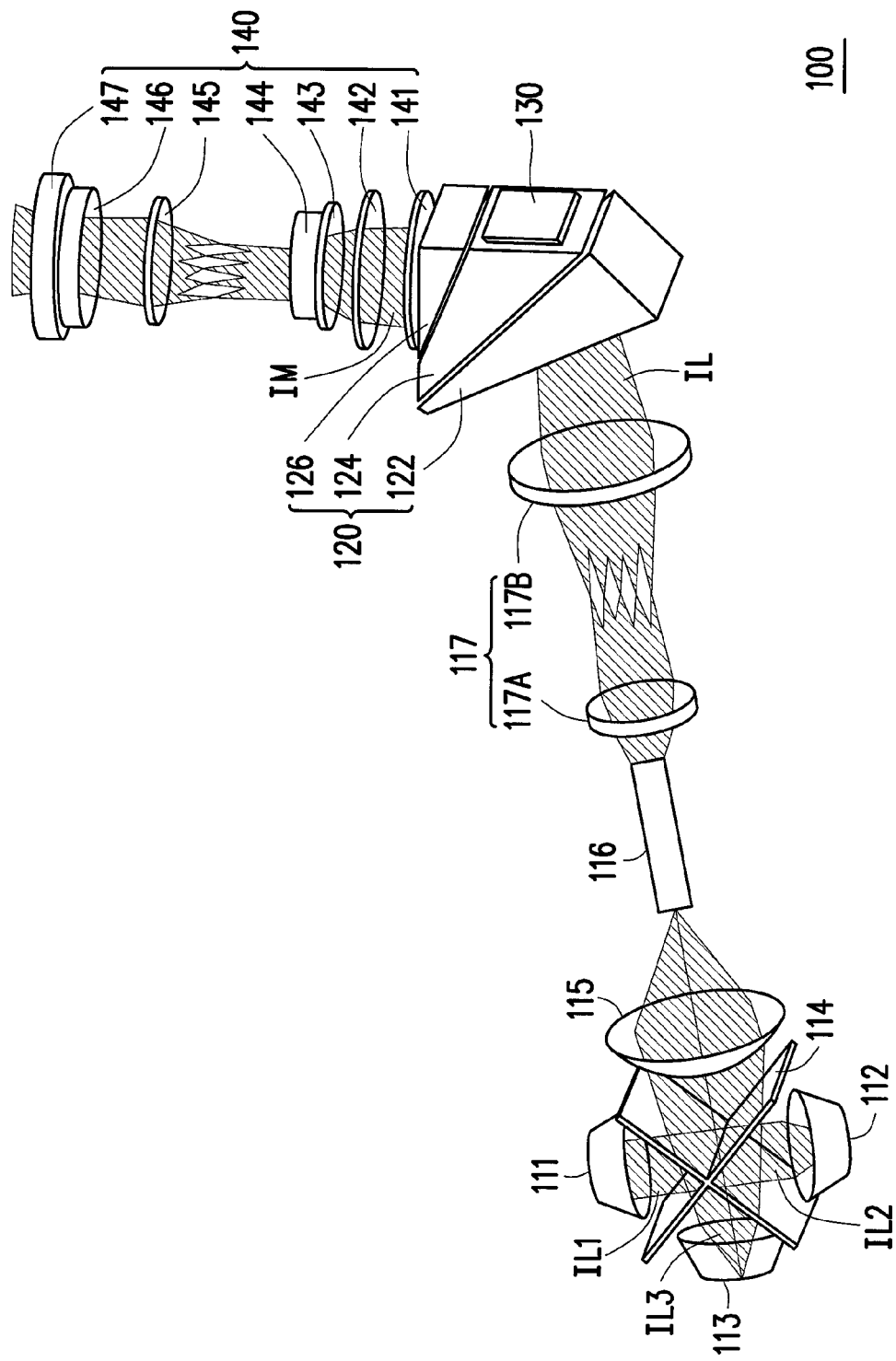
FIG. 1 is a schematic diagram of a projection apparatus according to an embodiment of the disclosure.
Figure 2A:
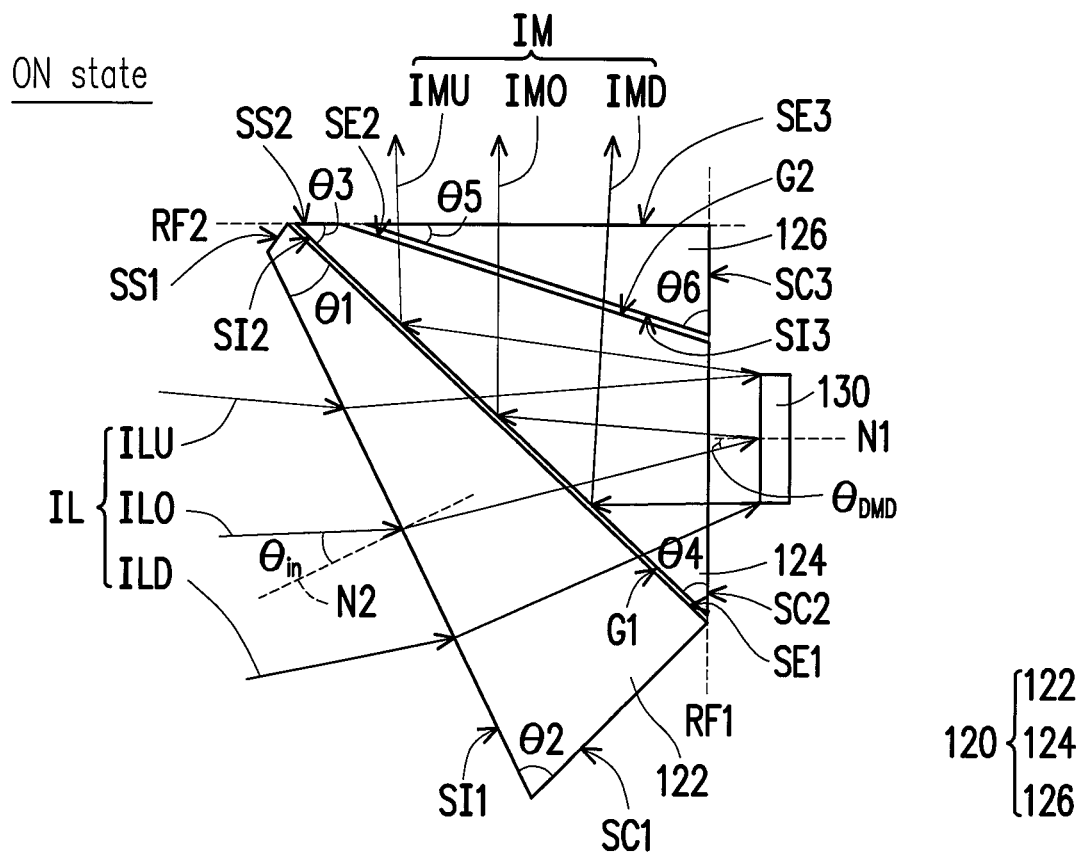
FIG. 2A is an enlarged view illustrating a prism group, a DMD, and transmission paths of illumination beams and image beams therebetween when micro-mirrors of the DMD are in ON state.
Figure 2B:
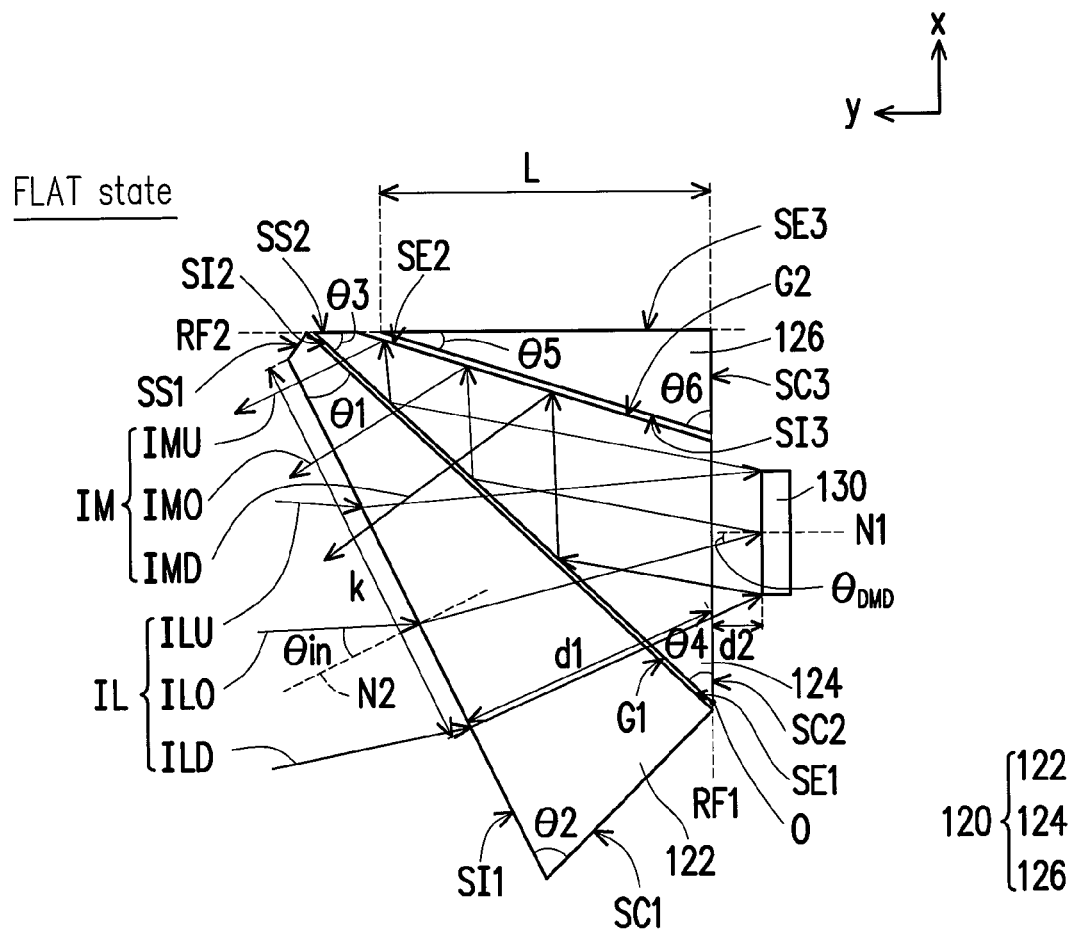
FIG. 2B is an enlarged view illustrating a prism group, a DMD, and transmission paths of illumination beams and image beams therebetween when micro-mirrors of the DMD are in Flat state.

FIG. 1 is a schematic diagram of a projection apparatus according to an embodiment of the disclosure. FIG. 2A is an enlarged view illustrating a prism group, a DMD, and transmission paths of illumination beams and image beams therebetween when micro-mirrors of the DMD are in ON state. FIG. 2B is an enlarged view illustrating a prism group, a DMD, and transmission paths of illumination beams and image beams therebetween when micro-mirrors of the DMD are in Flat state.

Referring to FIG. 1 to FIG. 2B, a projection apparatus 100 comprises an illumination system 110, a prism group 120, a DMD 130, and a projection lens 140. The illumination system 110 is applied for providing an illumination beam IL. FIG. 1 illustrates an implementation configuration of the illumination system 110, but the present embodiment is not limited thereto. As shown in FIG. 1, the illumination system 110 may comprise a first light source 111, a second light source 112, a third light source 113, a beam combination element 114, a condenser lens 115, an integration rod 116, and a Relay lens 117. The first light source 111 may include at least one first light emitting diode (LED) adapted to emitting first illumination beams IL1. The second light source 112 may include at least one second LED adapted to emitting second illumination beams IL2. The third light source 113 may include at least one third LED adapted to emitting third illumination beams IL3, wherein colours of the first illumination beams IL1, the second illumination beams IL2, and the third illumination beams IL3 are red, blue, and green, respectively. However, the disclosure is not limited thereto.

The beam combination element 114 is disposed on transmission paths of the first illumination beams ILL the second illumination beams IL2, and the third illumination beams IL3, so as to combine the first illumination beams ILL the second illumination beams IL2, and the third illumination beams IL3. The beam combination element 114 may be an X-cube, but the present embodiment is not limited thereto.

The condenser lens 115 is disposed on a transmission path of the illumination beams IL (including the first illumination beams IL1, the second illumination beams IL2, and the third illumination beams IL3) coming from the beam combination element 114, so as to converge the illumination beams IL. The integration rod 116 is disposed on a transmission path of the illumination beams IL coming from the condenser lens 115, and the illumination beams IL are converged into the integration rod 116. The Relay lens 117 is disposed on a transmission path of the illumination beams IL coming from the integration rod 116, and the illumination beams IL are transmitted to the prism group 120 through the Relay lens 117. In the embodiment, the Relay lens 117 includes lenses 117A and 117B, wherein the lens 117A is located between the lens 117B and the integration rod 116, but the composition of the Relay lens 117 is not limited thereto.

The prism group 120 is disposed on a transmission path of the illumination beams IL coming from the illumination system 110 and comprises a first prism 122, a second prism 124, and a third prism 126. In the embodiment, the first prism 122, the second prism 124, and the third prism 126 are made of a same material, and a refractive index of the material may be above 1.4 and below 2.

As shown in FIG. 2A, the first prism 122 has a first light incidence surface SI1, a first light emitting surface SE1, and a first connecting surface SC1 connecting the first light incidence surface SI1 and the first light emitting surface SE1. In the embodiment, the first prism 122 may further has a first side surface SS1 connecting the first light incidence surface SI1 and the first light emitting surface SE1. Besides, the first light emitting surface SE1 may be perpendicular to the first connecting surface SC1, wherein an inner angle θ1 between the first light incidence surface SI1 and the first light emitting surface SE1 is an acute angle, and an inner angle θ2 between the first light incidence surface SI1 and the first connecting surface SC1 is an acute angle.

The second prism 124 is close to the first light emitting surface SE1 and has a second light incidence surface SI2, a second light emitting surface SE2, and a second connecting surface SC2 connecting the second light incidence surface SI2 and the second light emitting surface SE2, wherein the second light incidence surface SI2 is parallel to the first light emitting surface SE1 and located between the first light emitting surface SE1 and the second light emitting surface SE2, and a first air gap G1 is between the second light incidence surface SI2 and the first light emitting surface SE1. In the embodiment, the second prism 124 may further has a second side surface SS2 connecting the second light incidence surface SI2 and the second light emitting surface SE2. Besides, an inner angle θ3 between the second light incidence surface SI2 and the second side surface SS2 is an acute angle, and an inner angle θ4 between the second light incidence surface SI2 and the second connecting surface SC2 is an acute angle. For example, the inner angles θ3 and θ4 are 45°, respectively.

The third prism 126 is close to the second light emitting surface SE2 and has a third light incidence surface SI3, a third light emitting surface SE3, and a third connecting surface SC3 connecting the third light incidence surface SI3 and the third light emitting surface SE3, wherein the third light incidence surface SI3 is parallel to the second light emitting surface SE2 and located between the second light emitting surface SE2 and the third light emitting surface SE3, and a second air gap G2 is between the third light incidence surface SI3 and the second light emitting surface SE2. In the embodiment, the third connecting surface SC3 is perpendicular to the third light emitting surface SE3, wherein an inner angle θ5 between the third light incidence surface SI3 and the third light emitting surface SE3 is an acute angle, and an inner angle θ6 between the third light incidence surface SI3 and the third connecting surface SC3 is an acute angle. For example, the inner angle θ5 is above 29° and below 31°. Moreover, the second connecting surface SC2 and the third connecting surface SC3 are located on a first reference plane RF1 parallel to the DMD 130, and the second side surface SS2 and the third light emitting surface SE3 are located on a second reference plane RF2 perpendicular to the DMD 130.

The DMD 130 faces the second connecting surface SC2 and converts the illumination beams IL into image beams IM. The DMD 130 comprises a plurality of micro-mirrors (not shown), wherein tilt angles (i.e. the angle between the normal line N1 of the DMD 130 and the normal line of the micro-mirror) of the micro-mirrors are 12°, 0°, and −12° in ON, FLAT, and OFF states, respectively. In one embodiment, the projection apparatus 100 may further comprises a cover glass (not shown) located between the DMD 130 and the second connecting surface SC2, so as to protect the DMD 130.

Referring to FIG. 1, the projection lens 140 is disposed on a transmission path of the image beams IM and located next to the third light emitting surface SE3 (as shown in FIG. 2A). FIG. 1 illustrates an implementation configuration of the projection lens 140, but the present embodiment is not limited thereto. As shown in FIG. 1, the projection lens 140 may comprise lenses 141, 142, 143, 144, 145, 146 and 147 sequentially arranged along the transmission path of the image beams IM.

To explain how the prism group 120 works, FIG. 2A and FIG. 2B illustrate three illumination beams ILU, ILO, and ILD and three corresponding image beams IMU, IMO, and IMD, wherein the illumination beam ILU represents the upward marginal beam, the illumination beam ILO represents the on-axis beam, and the illumination beam ILD represents the downward marginal beam.

Referring to FIG. 2A and FIG. 2B, after the illumination beams ILU, ILO, and ILD enters the prism group 120 through the first light incidence surface SI1, the illumination beams ILU, ILO, and ILD pass through the first light emitting surface SE1, the first air gap G1, the second light incidence surface SI2 and the second connecting surface SC2 sequentially and then transmitted to the DMD 130. The DMD 130 converts the illumination beams ILU, ILO, and ILD into image beams IMU, IMO, and IMD, and the image beams IMU, IMO, and IMD are reflected by the micro-mirrors of the DMD 130 and enter the prism group 120 through the second connecting surface SC2.

When the micro-mirrors of the DMD 130 are in On state, as shown in FIG. 2A, the image beams IMU, IMO, and IMD pass through the second light incidence surface SI2 and are reflected by the second light incidence surface SI2 through total inner reflection. The reflected image beams IMU, IMO, and IMD then pass through the second light emitting surface SE2, the second air gap G2, and the third light incidence surface SI3 sequentially and exit the prism group 120 from the third light emitting surface SE3.

To ensure the image beams IMU, IMO, and IMD being reflected by the second light incidence surface SI2 through total inner reflection (TIR) Equation, the inner angle θ1 should comply with equation (1) as shown below.

$$\sin \theta_{in} = n \sin\left[45° - \sin^{-1}\left(\frac{\sin \theta_{DMD}}{n}\right) - \theta 1\right] \quad (1)$$

Among the symbols above, n is the refractive index of the prisms (including the first prism 122, the second prism 124, and the third prism 126) in the prism group 120. $\theta_{in}$ is the incident angle between the normal line N2 of the first light incidence surface SI1 and the transmission direction of the illumination beam ILO at the first light incidence surface SI1. $\theta_{DMD}$ is the incident angle between the normal line N1 of the DMD 130 and the illumination beam ILO before impinging on the micro-mirror of the DMD 130.

Since the incident angle of the illumination beam ILU is the highest at the first light emitting surface SE1, it is certain that if the illumination beam ILU pass through the first light emitting surface SE1 without being reflected, the other illumination beams (e.g. illumination beams ILD and ILO) will be able to be pass through the first light emitting surface SE1. Moreover, if the illumination beam ILU is reflected by the second light incidence surface SI2 through TIR, the other illumination beams (e.g. illumination beams ILD and ILO) will be able to be reflected by the second light incidence surface SI2 through TIR. The balance between the incident angle $\theta_{in}$ and the inner angle θ1 are shown in equations (2) and (3), wherein F# is the f-number of the illumination system, and θt is the tilt angle of each of the micro-mirrors. As stated above, the tilt angles θt are 12°, 0°, and −12° in ON, FLAT, and OFF states, respectively.

$$\sin^{-1}\left\{\frac{1}{n}\sin\left[\theta_{in} + \sin^{-1}\left(\frac{1}{2F\#}\right)\right]\right\} + \theta 1 < \sin^{-1}\left(\frac{1}{n}\right) \quad (2)$$

$$\sin^{-1}\left\{\frac{\sin\left[\sin^{-1}\left(\frac{1}{2F\#}\right) - \theta_{DMD} + 2\theta t\right]}{n}\right\} - 45° < \sin^{-1}\left(\frac{1}{n}\right) \quad (3)$$

From equations (2) and (3), the range of refractive index n of the prisms is obtained, and the refractive index n of the prisms is within the range of 1.4 to 2.

On the other hand, when the micro-mirrors of the DMD 130 are in FLAT state, as shown in FIG. 2B, the image beams IMU, IMO, and IMD after enter the prism group 120 are sequentially reflected by the second light incidence surface SI2 and the second light emitting surface SE2 through TIR and then pass through the second light incidence surface SI2, the first air gap G1, and the first light emitting surface SE1 and exit the prism group 120 from the first light incidence surface SI1.

To ensure the FLAT state image beams IM to be reflected by the second light emitting surface SE2, while the ON state image beams IM to pass through the second light emitting surface SE2, the illumination beam ILU ought to being reflected by the second light emitting surface SE2. Moreover, to ensure the image beams IM all pass through the second light incidence surface SI2 after being reflected by the second light emitting surface SE2, the image beam IMD ought to pass through the second light incidence surface SI2 without being reflected by TIR. The critical conditions stated above are formulated as in equations (4) and (5).

$$\theta 5 + \sin^{-1}\left\{\frac{1}{n}\sin\left[\theta_{DMD} + \sin^{-1}\left(\frac{1}{2F\#}\right)\right]\right\} > \sin^{-1}\left(\frac{1}{n}\right) \quad (4)$$

$$2\theta 5 + \sin^{-1}\left\{\frac{1}{n}\left[\theta_{DMD} + \sin^{-1}\left(\frac{1}{2F\#}\right)\right]\right\} - 45° < \sin^{-1}\left(\frac{1}{n}\right) \quad (5)$$

From equations (4) and (5), the range of the inner angle θ5 is obtained, and the inner angle θ5 is above 29° and below 31°.

The position of the third light incidence surface SI3 can be describe using an (x, y) coordinate as shown in FIG. 2B. If the original point O (i.e. (0,0) coordinate) is located at the bottom of the second connecting surface SC2, positions of the points A and B with coordinates (L, a) and (b, 0) can be calculated, as shown in equations (6) and (7), wherein L is the length of the third light emitting surface SE3 along the direction y, k is the distance between the top of the first light incidence surface SI1 and the intersection of the illumination beam ILD and the first light incidence surface SI1, $d_1$ is the distance of which the illumination beam ILD travels in the prism group 120 before transmitting to the DMD 130, and $d_2$ is the distance between the second connecting surface SC2 and the DMD 130.

$$a = L - \left\{ \frac{1}{1 - \tan\left[\theta_{DMD} + \sin^{-1}\left(\frac{1}{2F\#}\right)\right]} \left[ k \sin(45° + \theta 5) - \frac{d_1}{n} \sin\left[\theta_{DMD} + \sin^{-1}\left(\frac{1}{2F\#}\right)\right] - 2d_2 \tan\left[\theta_{DMD} + \sin^{-1}\left(\frac{1}{2F\#}\right)\right] \right] \right\} \quad (6)$$

$$b = L - a\tan\theta 5 \quad (7)$$

Figure 3A:
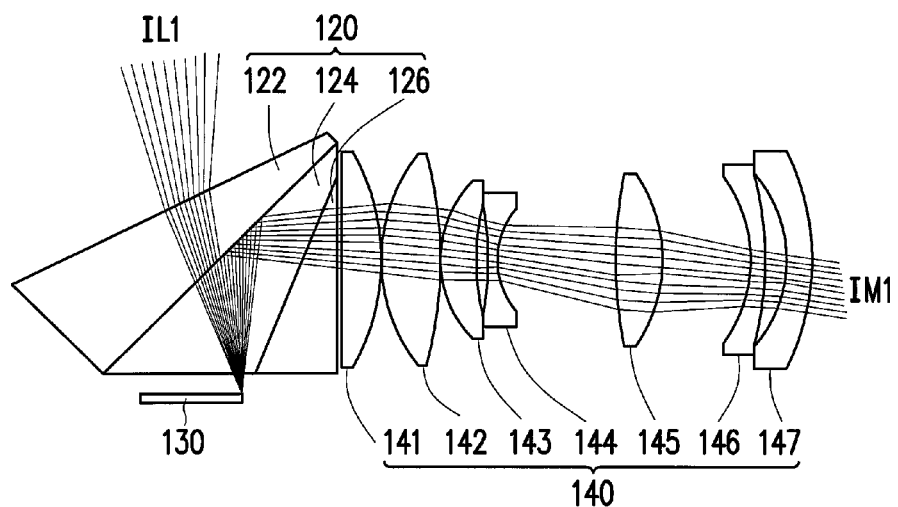
FIG. 3A to FIG. 3C are schematic diagrams illustrating transmission paths of illumination beams respectively from light sources 111, 112 and 113 in FIG. 1 and transmission paths of image beams thereof when micro-mirrors of the DMD are in ON state.
Figure 3B:
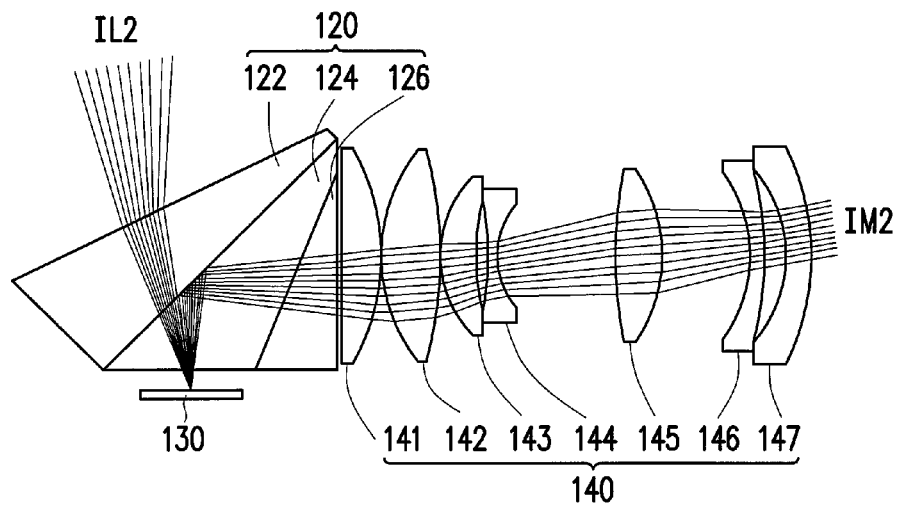
Figure 3C:
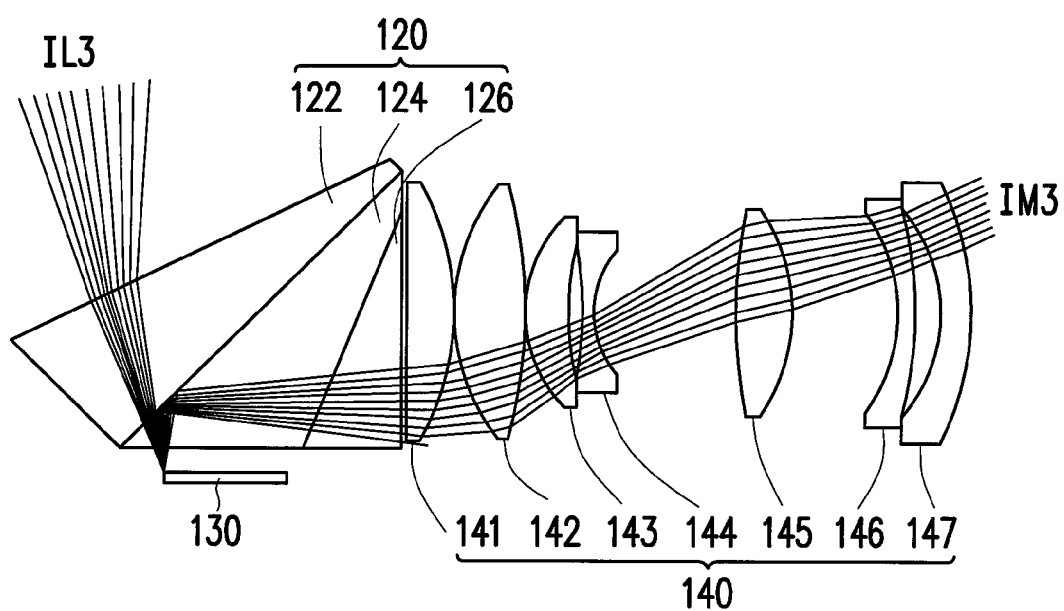
Figure 4A:
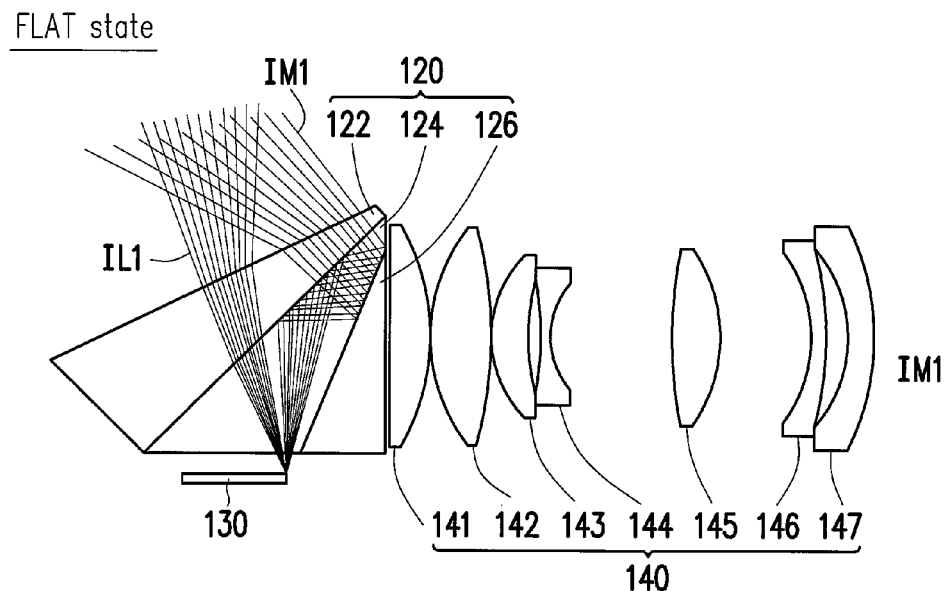
FIG. 4A to FIG. 4C are schematic diagrams illustrating transmission paths of illumination beams respectively from light sources 111, 112 and 113 in FIG. 1 and transmission paths of image beams thereof when micro-mirrors of the DMD are in FLAT state.
Figure 4B:
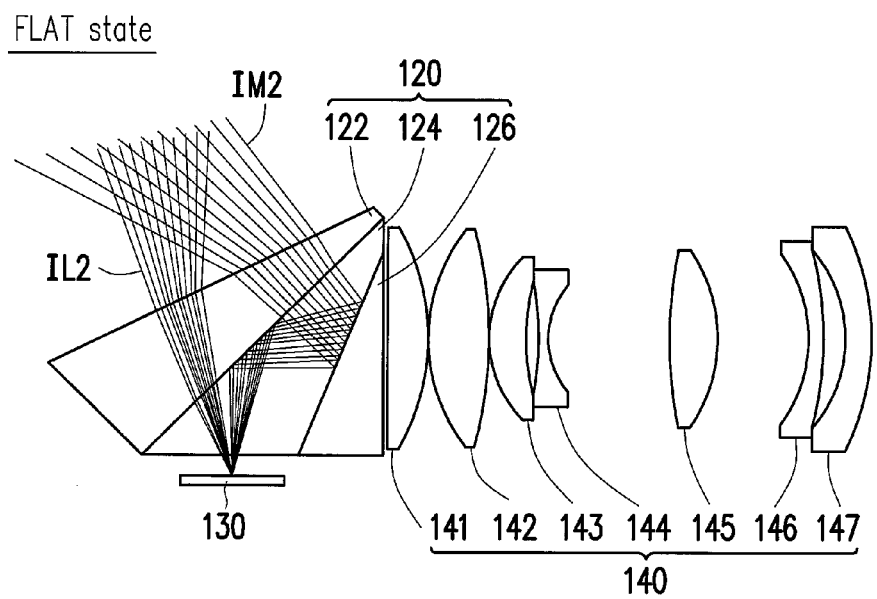
Figure 4C:
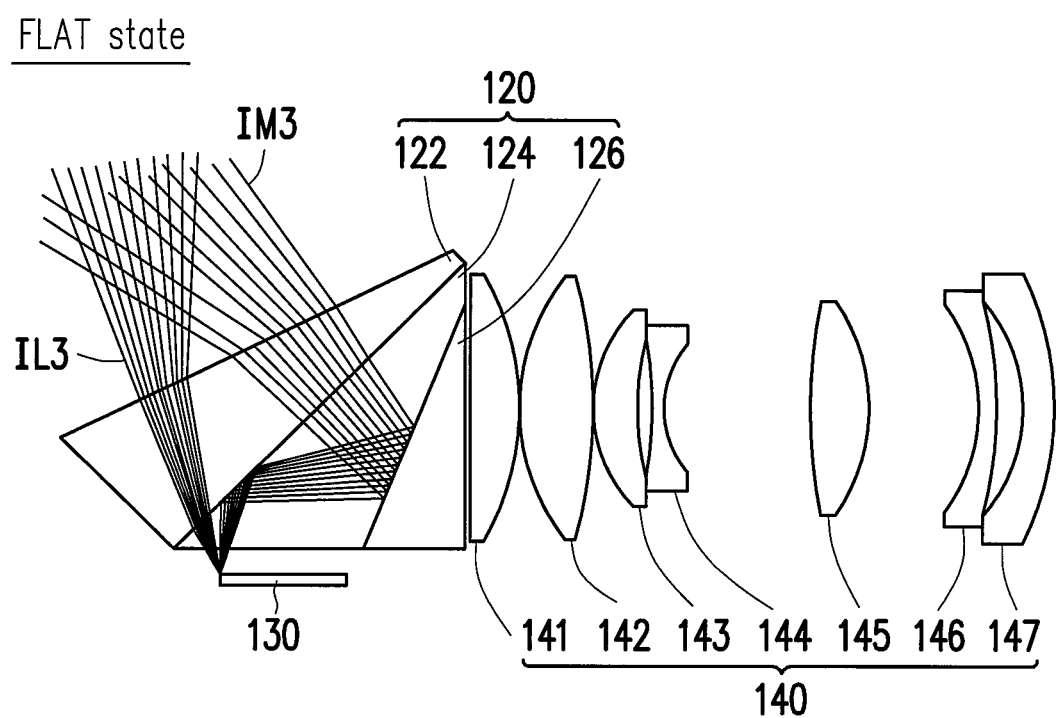
Figure 5A:
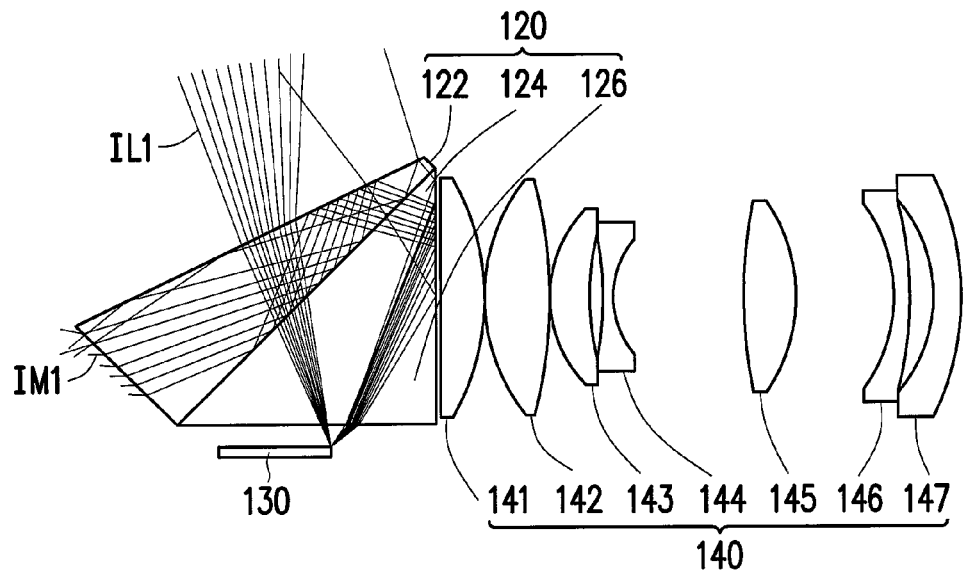
FIG. 5A to FIG. 5C are schematic diagrams illustrating transmission paths of illumination beams respectively from light sources 111, 112 and 113 in FIG. 1 and transmission paths of image beams thereof when micro-mirrors of the DMD are in OFF state.
Figure 5B:
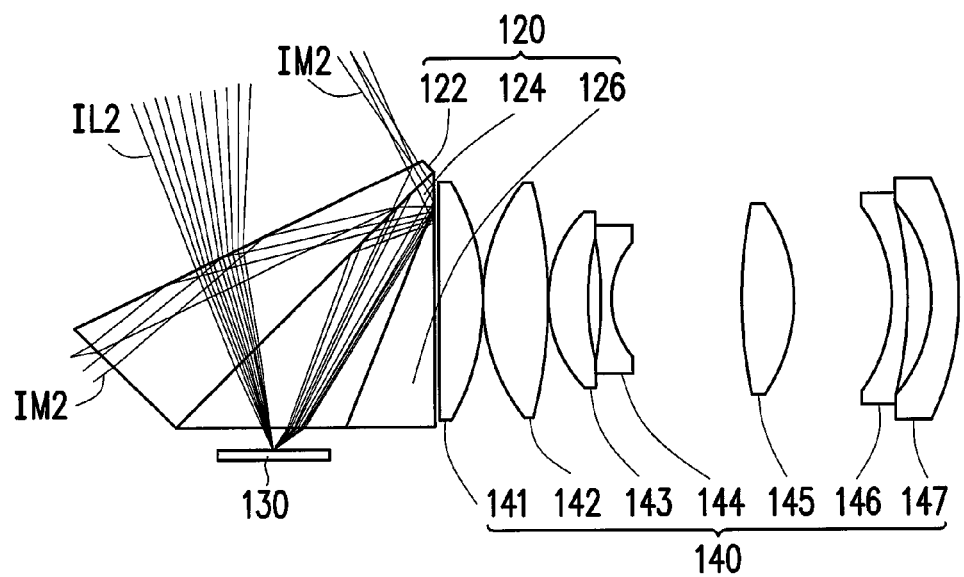
Figure 5C:
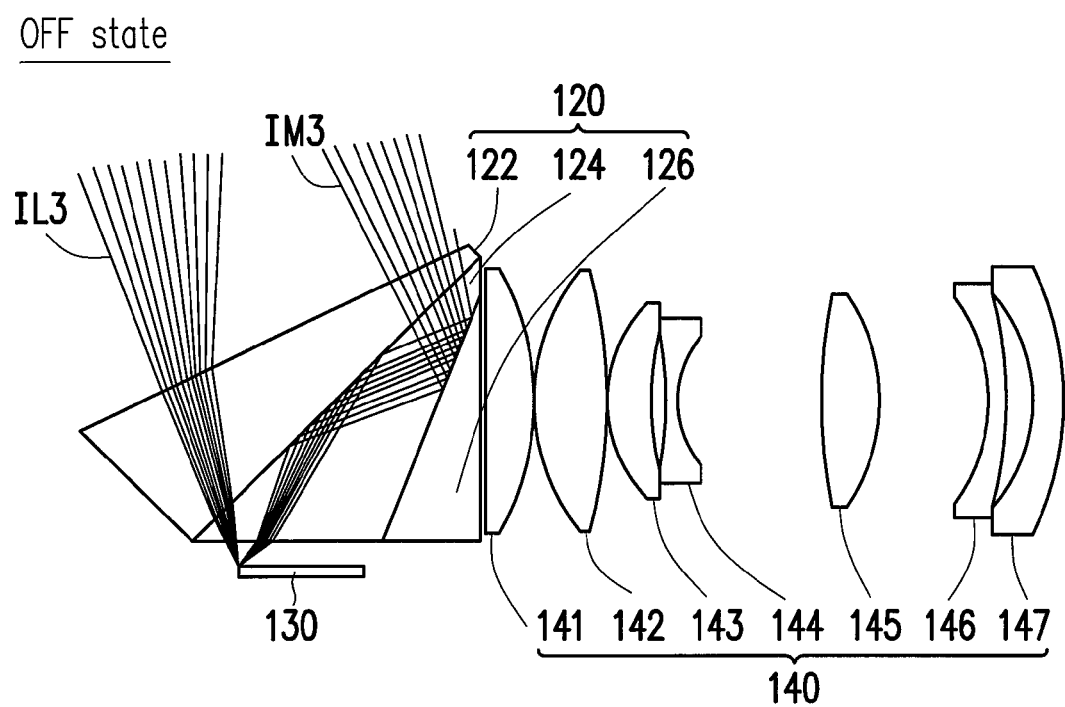

FIG. 3A to FIG. 3C are schematic diagrams illustrating transmission paths of illumination beams respectively from light sources 111, 112 and 113 in FIG. 1 and transmission paths of image beams thereof when micro-mirrors of the DMD are in ON state. FIG. 4A to FIG. 4C are schematic diagrams illustrating transmission paths of illumination beams respectively from light sources 111, 112 and 113 in FIG. 1 and transmission paths of image beams thereof when micro-mirrors of the DMD are in FLAT state. FIG. 5A to FIG. 5C are schematic diagrams illustrating transmission paths of illumination beams respectively from light sources 111, 112 and 113 in FIG. 1 and transmission paths of image beams thereof when micro-mirrors of the DMD are in OFF state.

As shown in FIG. 3A to FIG. 5C, the image beams IM1, IM2 and IM3 are deviated off the projection lens 140 by the prism group 120 through total inner reflection as the micro-mirrors of the DMD 130 are in OFF or FLAT states. Since the light leakage problem is ameliorated in OFF or FLAT states, contrast ratio of the projection apparatus 100 in FIG. 1 can be improved, thus the projection apparatus 100 may have good image quality. Moreover, since the OFF or FLAT states image beams IM1, IM2 and IM3 can be kept away from the projection lens 140 with only three prisms (including the first prism 122, the second prism 124, and the third prism 126), and an asymmetric stop is not needed in the embodiment to block OFF and FLAT states image beams IM1, IM2 and IM3, the volume and manufacturing costs of the projection apparatus 100 can be minimized, and the optical efficiency of the projection apparatus 100 can be kept.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A prism group, which is applied to a projection apparatus comprising a digital micro-mirror device and a projection lens, the prism group comprising:
    a first prism, having a first light incidence surface, a first light emitting surface, and a first connecting surface connecting the first light incidence surface and the first light emitting surface;
    a second prism, close to the first light emitting surface and having a second light incidence surface, a second light emitting surface, and a second connecting surface connecting the second light incidence surface and the second light emitting surface, wherein the second light incidence surface is parallel to the first light emitting surface and located between the first light emitting surface and the second light emitting surface, and a first air gap is between the second light incidence surface and the first light emitting surface; and
    a third prism, close to the second light emitting surface and having a third light incidence surface, a third light emitting surface, and a third connecting surface connecting the third light incidence surface and the third light emitting surface, wherein the third light incidence surface is parallel to the second light emitting surface and located between the second light emitting surface and the third light emitting surface, and a second air gap is between the third light incidence surface and the second light emitting surface,
    wherein the digital micro-mirror device faces the second connecting surface, and the projection lens is located next to the third light emitting surface, and
    wherein the first light emitting surface is perpendicular to the first connecting surface, and an inner angle between the first light incidence surface and the first light emitting surface is an acute angle.

2. The prism group as claimed in claim 1, wherein the first prism, the second prism and the third prism are made of a material having a refractive index above 1.4 and below 2.

3. The prism group as claimed in claim 1, wherein the third connecting surface is perpendicular to the third light emitting surface, and an inner angle between the third light incidence surface and the third light emitting surface is above 29° and below 31°.

4. The prism group as claimed in claim 1, wherein the second connecting surface and the third connecting surface are located on a first reference plane parallel to the digital micro-mirror device.

5. The prism group as claimed in claim 1, wherein the second prism further has a second side surface connecting the second light incidence surface and the second light emitting surface, and the second side surface and the third light emitting surface are located on a second reference plane perpendicular to the digital micro-mirror device.

6. The prism group as claimed in claim 5, wherein an inner angle between the second light incidence surface and the second side surface is 45°, and an inner angle between the second light incidence surface and the second connecting surface is 45°.

7. A projection apparatus, comprising:
    an illumination system, providing an illumination beam;
    a prism group, disposed on a transmission path of the illumination beam and comprising:
        a first prism, having a first light incidence surface, a first light emitting surface, and a first connecting surface connecting the first light incidence surface and the first light emitting surface;
        a second prism, close to the first light emitting surface and having a second light incidence surface, a second light emitting surface, and a second connecting surface connecting the second light incidence surface and the second light emitting surface, wherein the second light incidence surface is parallel to the first light emitting surface and located between the first light emitting surface and the second light emitting surface, and a first air gap is between the second light incidence surface and the first light emitting surface; and
        a third prism, close to the second light emitting surface and having a third light incidence surface, a third light emitting surface, and a third connecting surface connecting the third light incidence surface and the third light emitting surface, wherein the third light incidence surface is parallel to the second light emitting surface and located between the second light emitting surface and the third light emitting surface, and a second air gap is between the third light incidence surface and the second light emitting surface;
a digital micro-mirror device, facing the second connecting surface and converting the illumination beam into an image beam; and
a projection lens, disposed on a transmission path of the image beam and located next to the third light emitting surface,
wherein the first light emitting surface is perpendicular to the first connecting surface, and an inner angle between the first light incidence surface and the first light emitting surface is an acute angle.

8. The projection apparatus as claimed in claim 7, wherein the illumination beam coming from the illumination system enters the prism group through the first light incidence surface.

9. The projection apparatus as claimed in claim 7, wherein the first prism, the second prism and the third prism are made of a material having a refractive index above 1.4 and below 2.

10. The projection apparatus as claimed in claim 7, wherein the third connecting surface is perpendicular to the third light emitting surface, and an inner angle between the third light incidence surface and the third light emitting surface is above 29° and below 31°.

11. The projection apparatus as claimed in claim 7, wherein the second connecting surface and the third connecting surface are located on a first reference plane parallel to the digital micro-mirror device.

12. The projection apparatus as claimed in claim 7, wherein the second prism further has a second side surface connecting the second light incidence surface and the second light emitting surface, and the second side surface and the third light emitting surface are located on a second reference plane perpendicular to the digital micro-mirror device.

13. The projection apparatus as claimed in claim 12, wherein an inner angle between the second light incidence surface and the second side surface is 45°, and an inner angle between the second light incidence surface and the second connecting surface is 45°.

14. The projection apparatus as claimed in claim 7, further comprising:
a cover glass, located between the digital micro-mirror device and the second connecting surface.

* * * * *